United States Patent [19]

DeLong et al.

[11] Patent Number: 4,493,237

[45] Date of Patent: Jan. 15, 1985

[54] ELECTRONIC PIANO

[75] Inventors: Charles E. DeLong, Dubois; Gary A. Eck, Otwell, both of Ind.

[73] Assignee: Kimball International, Inc., Jasper, Ind.

[21] Appl. No.: 503,529

[22] Filed: Jun. 13, 1983

[51] Int. Cl.³ .......... G01H 1/02

[52] U.S. Cl. .......... 84/1.26; 84/1.12; 84/1.27; 84/1.1

[58] Field of Search .......... 84/1.1, 1.24, 1.26, 84/1.27, 1.01, 1.13

[56] References Cited

U.S. PATENT DOCUMENTS

| | | | |
|---|---|---|---|
| 4,033,219 | 7/1977 | Deutsch | 84/1.03 |
| 4,067,253 | 1/1978 | Wheelwright et al. | 84/1.1 |
| 4,079,650 | 3/1978 | Deutsch et al. | 84/1.26 |
| 4,201,106 | 5/1980 | Kimura et al. | 84/1.26 X |
| 4,299,153 | 11/1981 | Hoskinson et al. | 84/1.1 |
| 4,333,377 | 6/1982 | Niezgoda et al. | 84/1.1 X |

*Primary Examiner*—Forester W. Isen
*Attorney, Agent, or Firm*—Albert L. Jeffers; John F. Hoffman

[57] ABSTRACT

The invention relates to an electronic percussion-type musical instrument, such as an electronic piano, capable of producing electronically sounds simulating a piano, harpsichord or other keyboard percussion instrument. The keyboard is multiplexed to produce a serial time division multiplexed data stream having tri-level encoded signals in time slots corresponding to the keys, wherein the encoded signals indicate whether the key is undepressed, partially depressed or fully depressed. The amount of time for the key to travel in its undepressed to its fully depressed state is detected and a binary representation of the key velocity correlated to this timing is stored in a memory for readout synchronized with the scanning of the keyboard. In each time slot, a portion of the percussion envelope for the pertaining key is calculated and generated together with the discrete amplitude levels for the percussion envelope in a digital to analog conversion circuit. The conversion circuit comprises a digital to analog converter connected to the velocity data and having its analog output connected to the multiplying input of a multiplying digital to analog converter having its other input connected to the output of the envelope generator. The envelope keys tones from a generator in the keyer circuit to produce tones having frequencies corresponding to the depressed keys of the keyboard and velocity scaled envelopes calculated by the velocity and envelope generation circuitry. All of the processing is accomplished on a time-shared basis among the keys of the keyboard and then converted to parallel format for the keying operation.

21 Claims, 11 Drawing Figures

ELECTRONIC PIANO

BACKGROUND OF THE INVENTION

The present invention relates generally to an electronic keyboard musical instrument, and in particular to a percussion-type instrument such as an electronic piano or harpsichord having a velocity sensitive keyboard so that tones of higher amplitude will be produced the harder the keys are struck.

In a conventional acoustic piano, the strings are struck by hammers that are actuated by pressing keys of the keyboard so that the harder the key is pressed the greater is the force with which the hammers strike the strings thereby producing percussive tones of greater amplitude. A piano tone generally has a percussive envelope which will decay out with time regardless of whether the key is held and will snub off more quickly if the key is released. This type of percussive envelope is normally referred to as an ADSR envelope and has an attack portion of increasing amplitude, a rapid decay portion for a short time, a longer sustain portion of lower slope extending for a variable time depending on how long the key is held, and a release portion of high slope that occurs when the key is released and the damper contacts the strings thereby rapidly dampening out further vibrations.

A number of approaches have been taken in the past to develop an electronic instrument to simulate the sounds of an acoustic piano or harpsichord, but such instruments have generally been unsatisfactory. One widely used technique is to utilize analog circuits which are typically duplicated for each key of the keyboard. Such analog systems usually employ resistor-capacitor circuits that provide the expotenial decay characteristics of the decay and sustain portions of an envelope for a piano sound.

In order to detect the amount of force with which the key is struck, one commonly used technique is to time the movement of a keyswitch as it moves from one bus to another by using resistor-capacitor circuits or switched capacitor techniques. A further technique for detecting the velocity is to use piezoelectric devices that have alterable electronic characteristics depending on the amount of mechanical force with which they are struck.

One of the primary disadvantages to analog techniques used in the past is that the analog circuitry would potentially be duplicated for each key of the keyboard. This leads to an increase of the overall cost of the system, and if it is desired to change the attack and decay or velocity characteristics, the modification must be duplicated for each key of the keyboard. A further disadvantage is that the components making up the analog circuits are often not perfectly uniform so that unwanted differences in attack, decay and velocity characteristics may occur from key to key.

The concept of time sharing circuitry among a plurality of keys of the keyboard has been employed in the past in electronic musical instruments, such as electronic pianos and electronic organs. The circuitry in these instruments has not had the flexibility, controllability and economy of parts which are desirable in order to produce authentic piano-like sounds at a sufficiently low enough cost.

SUMMARY OF THE INVENTION

In the present invention, keyboard is multiplexed and a serial data stream of key state-encoded signals representing the states of the keys is processed by the circuitry on a time-shared basis among all of the keys. In order to sense velocity, a counter, during each time slot in the multiplexed data stream, has loaded into it from a memory data indicating the amount of time that the keyswitch has already been partially depressed, the counter is then incremented, and the new count is then loaded back into the memory for further processing during the next or some subsequent scan. When the key is fully depressed, a binary number representing the time of keyswitch transition which is related to the velocity with which the key is struck is stored in the memory and read out onto a velocity output during the time slot for that key as long as the key remains depressed.

When the key has been fully depressed, a strike pulse causes the envelope generator to begin generating a series of discrete amplitude levels, each level being calculated during the time slot for the fully depressed key. The amplitude levels are combined with the velocity data to produce a keying envelope that is scaled depending on the velocity with which the key is struck. The scaled envelope levels, which are brought out as a serial data stream, are demultiplexed and fed to the keying inputs of keyers, the tone inputs of which are connected to a tone generator. Thus, tones having frequencies corresponding to the depressed keys and percussion ADSR envelopes scaled in accordance with the velocity with which the keys are struck are produced at the output.

Because the envelope and velocity circuitry is time shared among all of the keys, the ADSR characteristics can be maintained uniform for all of the keys, and changes to the ADSR characteristics, such as when different voicing is selected, will apply the same to all of the keys. Since the velocity with which each key is struck is retained in a memory, the velocity information can be used by other circuits, such as circuits for producing fill notes, repeat circuits, circuits for generating note patterns, and other easy play features typically only found on electronic organs.

Both the velocity and envelope data are initially generated in digital form, so that this data together with the address data for the keys can be interfaced with a computer or microprocessor so that the data can be manipulated in any desired way and then fed back into the system for processing by the output circuitry. Other advantages to the system will be apparent from the detailed description which follows.

In general, and in one form thereof, the invention relates to an electronic keyboard musical instrument comprising a keyboard having a plurality of playing keys adapted to be depressed wherein each of the keys has the capability of being selectively in a nominal undepressed state, a nominal partially depressed state, or a nominal fully depressed state, and a multiplexer for multiplexing the keyboard and developing a plurality of time slots corresponding on a one-to-one basis to the keys and generating key state signals in the time slots each indicating whether the pertaining key is in the undepressed, partially depressed or fully depressed state. A velocity computing circuit is time shared among the keys of the keyboard and is responsive to the key state signals for computing each time slot of the keyboard scan. Velocity data correlated to the amount of time that the pertaining key has been in its partially depressed state is generated. The data is stored in locations of a velocity memory assigned to the keys of the keyboard and the computing means updates the original data on subsequent scans of the keyboard as long as the pertaining keys are still in their partially depressed states. A final value of each of the velocity data for the depressed keys is stored in the memory locations assigned thereto when the pertaining keys reach their fully depressed states. An envelope generator is time-shared among the keys and is responsive to the key state signals for computing and outputting percussion envelopes for the fully depressed keys, each envelope comprising a plurality of discrete amplitude levels computed in the time slots of the pertaining keys during a plurality of scans of the manual. The envelope generator stores data correlated to the amplitude levels calculated during each time slot at locations of an envelope memory assigned to the pertaining keys to provide a reference for the amplitude levels calculated in a subsequent scan. The velocity computing circuit reads the final value of velocity data out of the velocity memory onto an output in synchronism with the outputting of the percussion envelope amplitude levels, and means are provided for combining the read out velocity data and output percussion amplitude levels to produce on a time shared basis among the keys of the keyboard envelopes scaled by the velocity data for the respective keys. A tone generation system is responsive to the key state data and to the scaled envelopes for generating tones of frequencies corresponding to the fully depressed keys and having the respective scaled percussion envelopes.

In one form of the invention, the tone generation is accomplished by means of keyers fed by tones from a tone generator and the percussion envelopes from a demultiplexer. The updating of the velocity and envelope data need not occur on each scan of the keyboard, but it could be every other scan, or every third scan, etc., depending on the multiplex rate, degree of fineness of control desired, and the like.

It is an object of the present invention to provide a keyboard musical instrument capable of producing percussion-type sounds that are scaled in amplitude depending on the velocity with which the keys are struck.

It is a further object of the present invention to provide an electronic keyboard musical instrument wherein the circuitry for generating the velocity data and envelope data is time shared among all of the keys, yet is capable of easy modification and control in order to change the percussion characteristics for the keys.

It is still a further object of the present invention to provide an electronic keyboard musical instrument, such as an electronic piano, employing economy of circuitry yet easy controllability of the ADSR parameters and velocity sensitivity.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 4 is a diagram of a ADSR envelope generated by the circuit of FIG. 3;

DETAILED DESCRIPTION

Figures 1A, 2:
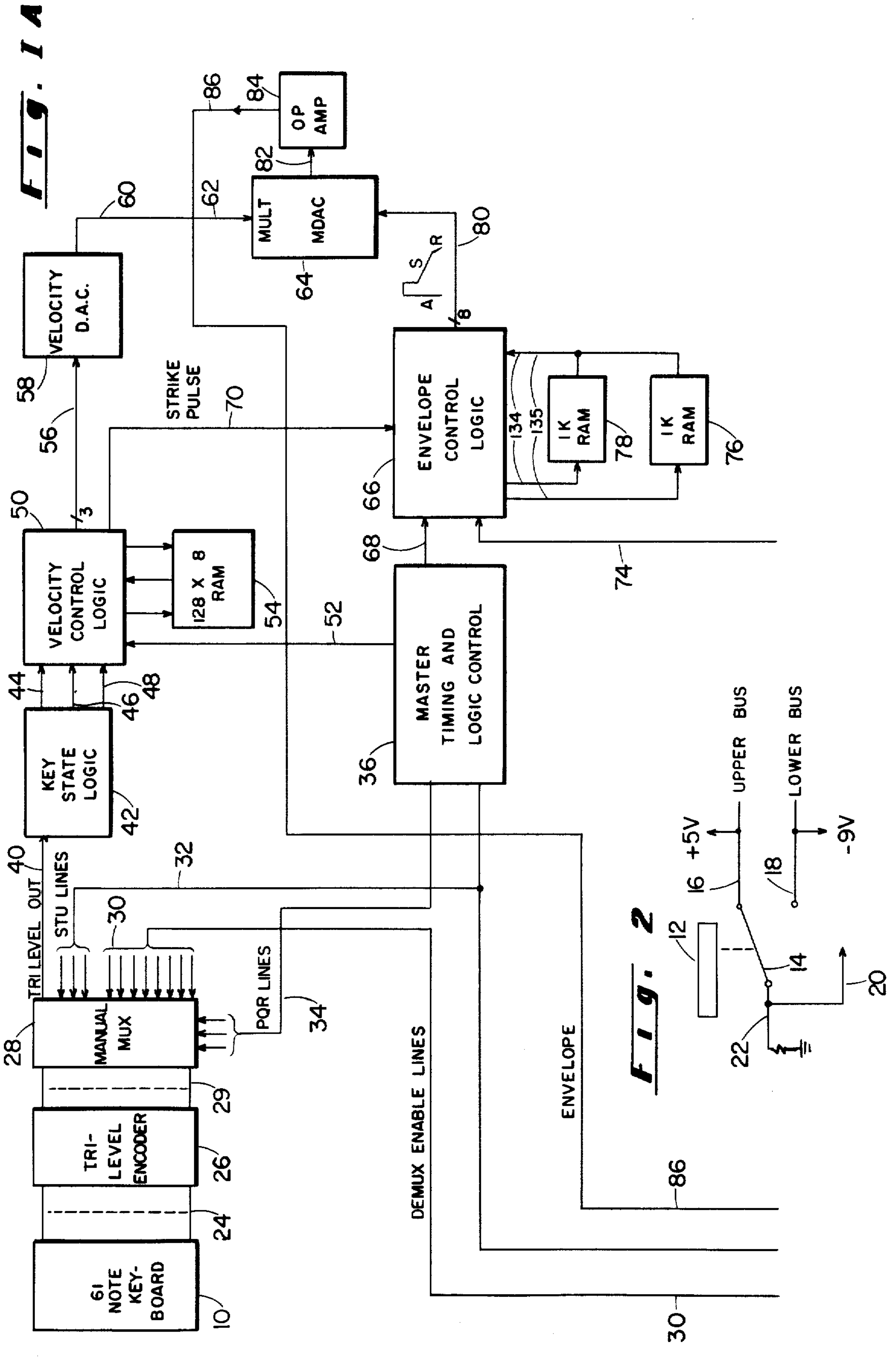
FIGS. 1A and 1B together form an overall block diagram of the system according to the present invention.
FIG. 2 is a schematic of an illustrative keyswitch circuit.
Figure 1B:
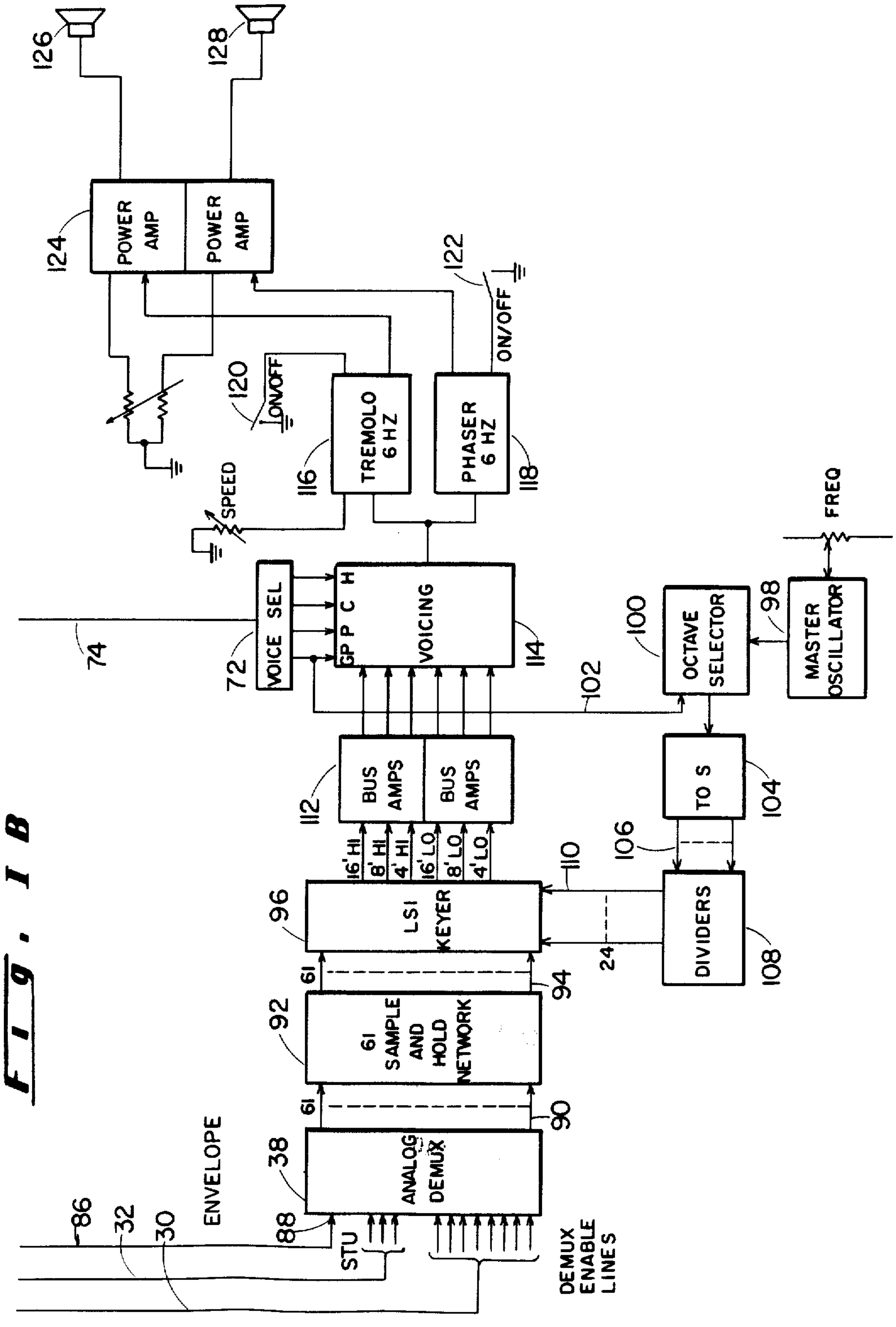

Referring now to FIGS. 1A, 1B and 2, the system according to the present invention comprises a manual 10 having a plurality of conventional playing keys 12 which are adapted to be actuated by the person playing the instrument. Since the keys are touch or velocity sensitive, a mechanical or optical circuit must be utilized to enable timing of the key as it moves from its undepressed state to its fully depressed state. FIG. 2 illustrates an exemplary arrangement of accomplishing this. In the device of FIG. 2, the keyswitch 14 is mechanically actuated by key 12 and moves from contact with upper bus 16 in its undepressed or rest state down into contact with lower bus 18 when the key 12 is fully depressed. Output 20 will carry a 5 volt potential when key 12 is undepressed, will be at ground potential due to line 22 connected thru a resistance to ground, when it is in the process of traveling between buses 16 and 18, and will carry a potential of negative 9 volts when it has contacted lower bus 18. Thus, output 20 will carry one of three voltage levels depending on the state of keyswitch 14.

The arrangement illustrated in FIG. 2 is only exemplary, and other techniques could be utilized, such as breaking optical beams as the keyswitch moves out of its undepressed state and into its fully depressed state, or contacting two sets of contacts on a printed circuit board in succession, after the key is depressed. In this latter arrangement, the system may not sense any change in key position until the first contact is engaged, and then will time the amount of lapse time between engagement with the first contact and engagement with the second contact as the key is fully depressed.

In any event, all that is necessary is that the position of the key 12 be encoded so that the system receives either a key undepressed, key partially depressed, or key fully depressed condition. Of course, the actual position of the key 12 itself when each of these three states are reached is arbitrary, and a certain degree of key movement can occur before the system sees the key as having moved out of its undepressed condition. Likewise, the key can reach its "fully depressed" state prior to actually bottoming out against the mechanical stop on the keyboard.

In the system shown in FIG. 1A, the outputs 24 from manual 10 are encoded by tri-level encoder 26 to provide to manual multiplexer 28 sixty-one lines 29 of data indicating one of three states for each key 12. Multiplexer 28 is driven by STU lines 32 and PQR lines 34 generated by master timing and logic control circuit 36. Demultiplex enable lines 30 are connected to demultiplexer 38 (FIG. 1B). Multiplexer 28 produces on output line 40 a time division multiplexed series of tri-level encoded signals assigned to time slots corresponding on a one-to-one basis to the keys of manual 10.

Key state logic circuit 42 decodes the tri-level inputs on line 40 to produce on line 44 a logic one if the key is in its undepressed state, that is, in contact with the upper bus 16 in the exemplary circuit, a logic 1 on line 46 if the keyswitch 14 is between buses 16 and 18 and a logic 1 on line 48 if keyswitch 14 is in contact with lower bus 18. It is again noted that the arrangement shown in FIG. 2 for encoding keyswitch 14 is only exemplary and is used simply for the purposes of illustration.

Control logic block 50 receives inputs 44, 46 and 48 from key state logic block 42 and is driven in synchronism with multiplexer 28 by means of timing information on lines 52 from timing and logic control block 36. A 128×8 ram 54 is connected to velocity control logic block 50, and serves to store the timing data for the movement of keyswitch 14 between buses 16 and 18 for each time slot of serial data on line 40. Velocity control logic block 50 produces on output 56 a time division multiplexed serial data stream comprising a plurality of three bit bytes each indicating one of eight levels of amplitude for the envelope. A velocity digital to analog converter 58 converts the digital data on line 50 to analog data on output 60, which is connected to the multiplying input 62 of multiplying digital to analog converter 64.

Envelope control logic block 66, which is driven in synchronism with velocity control logic 50 and multiplexer 28 by address lines 68 from timing and logic control block 36, receives strike pulses on input 70 from velocity control logic 50 and voicing selection data from voicing selection block 72 on input 74. Envelope control logic block 66 has connected thereto a pair of 128 by 8 rams 76 and 78, which store 16 bits of envelope amplitude data for each of the keys 12 of keyboard 10 so that the envelope control logic can compute the discrete amplitude levels for each of the envelopes on a time shared basis among the keys of keyboard 10. Envelope control logic block 66 produces on outputs 80 an 8 bit wide time division multiplexed data stream carrying discrete amplitude levels for the amplitude envelopes pertaining to the fully depressed keys 12 of keyboard 10. Outputs 80 are connected to the data inputs of multiplying digital to analog converter 64, which produces on its output 82 a series of time division multiplexed analog envelope levels generated in accordance with the logic in block 66 and scaled in accordance with the output 60 of velocity digital to analog converter 58. Output 82 passes through op amps 84 which produce on output 86 the amplitude levels that are connected to the envelope input 88 of demultiplexer 38 (FIG. 1B).

Demultiplexer 38 demultiplexes the series of amplitude levels on input 86 to produce on 61 parallel outputs 90 the demultiplexed amplitude levels. Outputs 90 are connected to 61 sample and hold circuits 92 having outputs 94 connected to an LSI keyer bank 96. Master oscillator 98 feeds high frequency tones to octave selector 100 having a control input 102 connected to voice selector 72 in order to adjust octaves depending on particular voices which are selected. Octave selector 100 feeds a top octave synthesizer 104 that produces tones on outputs 106 connected to dividers 108, which in turn feed 24 tones on inputs 110 to LSI keyer bank 96. Keyer bank 96 feeds a pair of bus amps 112 which are connected through a voicing circuit 114 controlled by voicing selector 72 and input a tremolo circuit 116 and a phaser circuit 118, which are controlled by on/off switches 120 and 122, respectively. The tones are then amplified in amplifiers 124 and acoustically reproduced by speakers 126 and 128.

Figure 3:
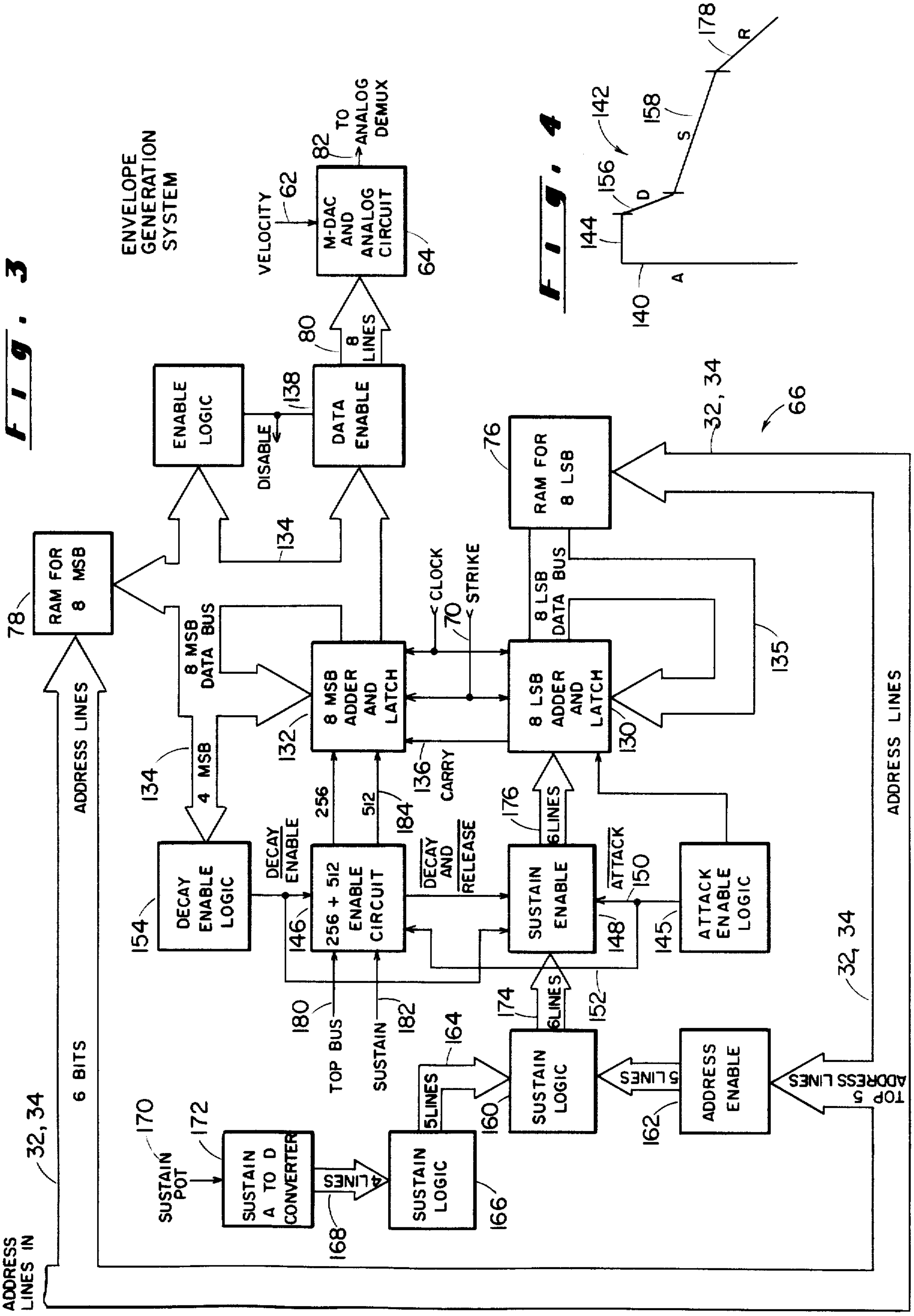
FIG. 3 is a block diagram of the envelope generator.

Referring now to FIG. 3, the envelope generation system 66 of FIG. 1A will be described in detail. At the heart of the envelope generation circuitry are a pair of adders and latches 130 and 132 for the 8 least significant bits and 8 most significant bits of the 16 bit amplitude levels for the envelopes. Adders and latches 130 and 132 are connected to rams 76 and 78 by data buses 134 and 135. A carry line 136 from adder 130 is connected to adder 132, and although adders 130 and 132 utilize 16 bits of data only the eight most significant bits are utilized in the output 80 from data enable block 138.

When a strike pulse appears on line 70 from velocity control logic block 50 (FIG. 1A), thereby indicating that the key for that particular time slot has made contact with the lower bus 18, an analog signal will appear on the multiplying input 62 of multiplying digital to analog converter 64 thereby turning the circuit on full to cause a full amplitude signal to appear on output 82. This is represented by line 140 in the ADSR envelope 142 illustrated in FIG. 4. Although a conventional attack line in an ADSR curve has a more gradual slope, the RC circuits in the sample and hold networks 92 (FIG. 1B) will impart an expotenial curve to the input on lines 90 even though envelope generation circuit 66 produces a very sharp leading edge. During the first time slot in which the pertaining key is fully depressed, adder 130 adds "1" and does this for the next three scans, which results in decrease in the amplitude of line 144 in envelope 142. Digital to analog converter 64 produces a smaller analog output 86 as the inputs 80 carry larger binary numbers. During each time slot, the stored binary number is read out of rams 76 and 78, the add word, in this case 1, is added to the number, and the new, larger number is then stored back in the appropriate location of memories 76 and 78. The adding of 1 during the attack mode is controlled by attack enable logic 145, which in turn disables 256/512 enable circuit 146 and sustain enable circuit 148 by appropriate signals on lines 150 and 152.

It must be kept in mind that the entire system shown in FIG. 3 is kept in synchronism with multiplexer 28, and performs computations for each time slot, which will differ depending on whether the key for that particular time slot is fully depressed or not, and also the amount of time which has elapsed since the key was fully depressed. Thus, the circuitry is shared among all of the keys of keyboard 10. For the sake of clarity, however, only the functioning of the circuitry for one time slot will be described, but the same type of operation will occur for all of the time slots.

After four manual scans of the particular time slot in question pertaining to a fully depressed key, decay enable logic block 154 will enable 256/512 enable circuit 146 to begin adding 256 to the data word withdrawn from ram 78 thereby producing the decay portion 156 of the ADSR envelope. It will be recalled that the larger the number produced at the output of data enable block 138, the smaller the analog signal on MDAC 64. The value 256 will continue to be added to the envelope data word until decay enable block 154 senses a particular amplitude level on data bus 134, and at the point, will disable block 146 and enable sustain enable block 148 to produce the lower slope sustain portion 158 of ADSR curve 142. The sustain slope is determined by the position of the key on the keyboard, or in other words, the frequency of the note to which it corresponds so that for lower frequency notes a longer sustain will be computed than for higher frequency notes. This simulates the action of an acoustic piano wherein the higher frequency notes sustain out more quickly than those in the lower portion of the keyboard.

Sustain adder 160 has as one of its inputs the five bit address for the particular key 12 from address enable block 162 connected to address lines 32, 34. The other input 164 is produced by sustain logic block 166, which has an adjustable input 168 from the controllable sustain potentiometer 170 and sustain analog to digital converter 172. These two digital words are added together by adder 160 and produced on output 174 connected to sustain enable block 148 to LSB adder and latch 130 over lines 176. If the key 12 is held down, the sustain will continue at the same rate until the voltage on output 82 from MDAC 64 will be essentially zero, and the tone will have completely sustained out.

If the key is released prior to total sustain, however, a very rapid decay occurs producing the high slope release portion 178 of ADSR curve 142. This is initiated by enable circuit 146 detecting that the keyswitch 14 is on the top bus 16 thereby producing a logic 1 on input 180, and that the sustain pedal is not depressed, indicated by an appropriate signal on input 182. If keyswitch 14 is on upper bus 16 and sustain is not selected, then enable circuit 146 will activate line 184 thereby adding the value 512 to the data in MSB adder 132 to cause the output 80 from data enable block 138 to increase much more rapidly thereby producing the high slope release portion 178 of ADSR curve 142.

The operation described above for the circuit of FIG. 3 is repeated for each time slot of the data stream corresponding to the keyboard scan with each amplitude level which is calculated stored in eight bit binary form in each of rams 76 and 78, read out on the next scan, incremented by the appropriate amount, written back into the ram and output by data enable block 138 to cause real time change in the amplitude envelope for the tone or tones being played.

Figure 8A:
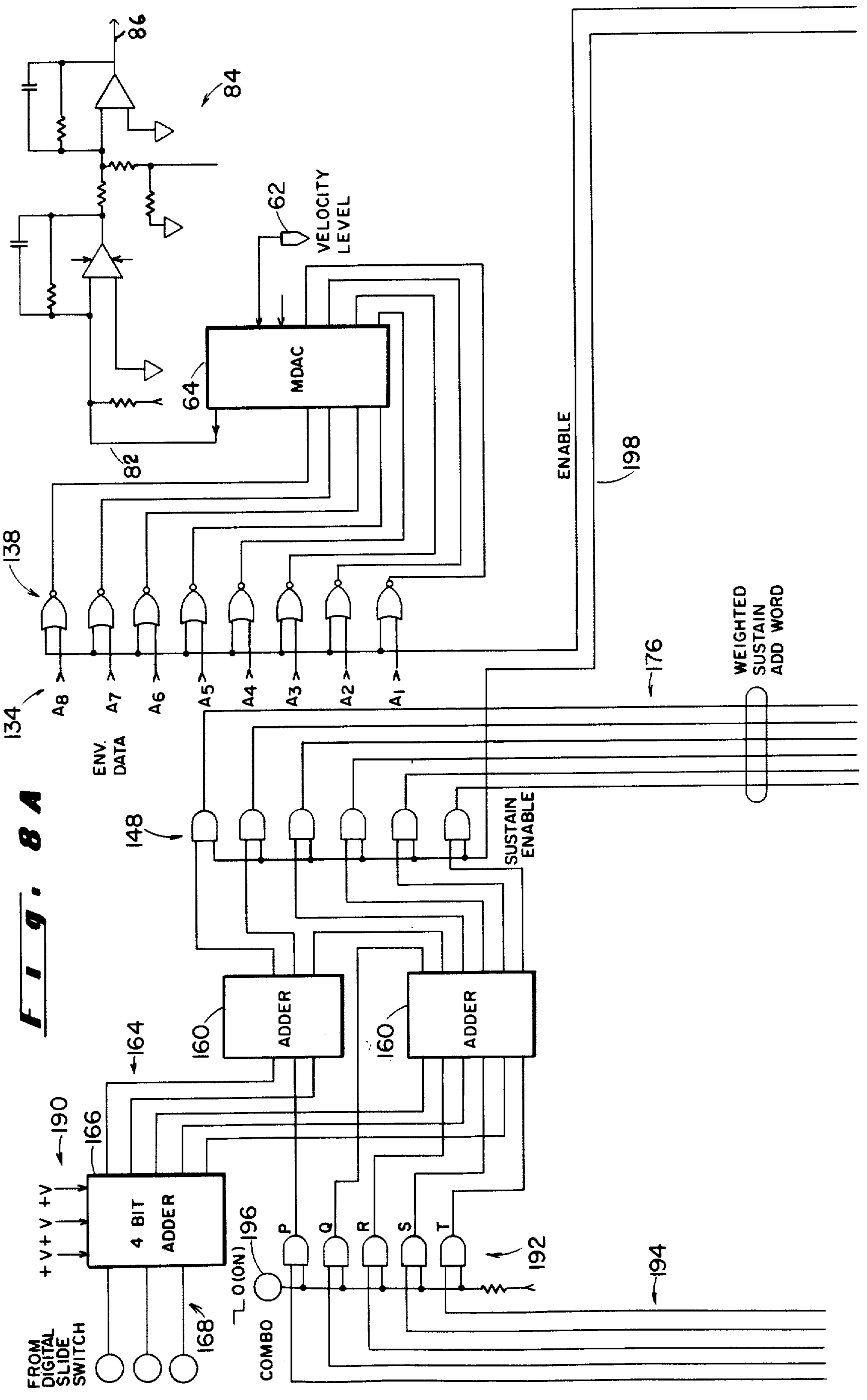
FIGS. 8A, 8B, and 8C together form a schematic for the envelope generation circuit.
Figure 8B:
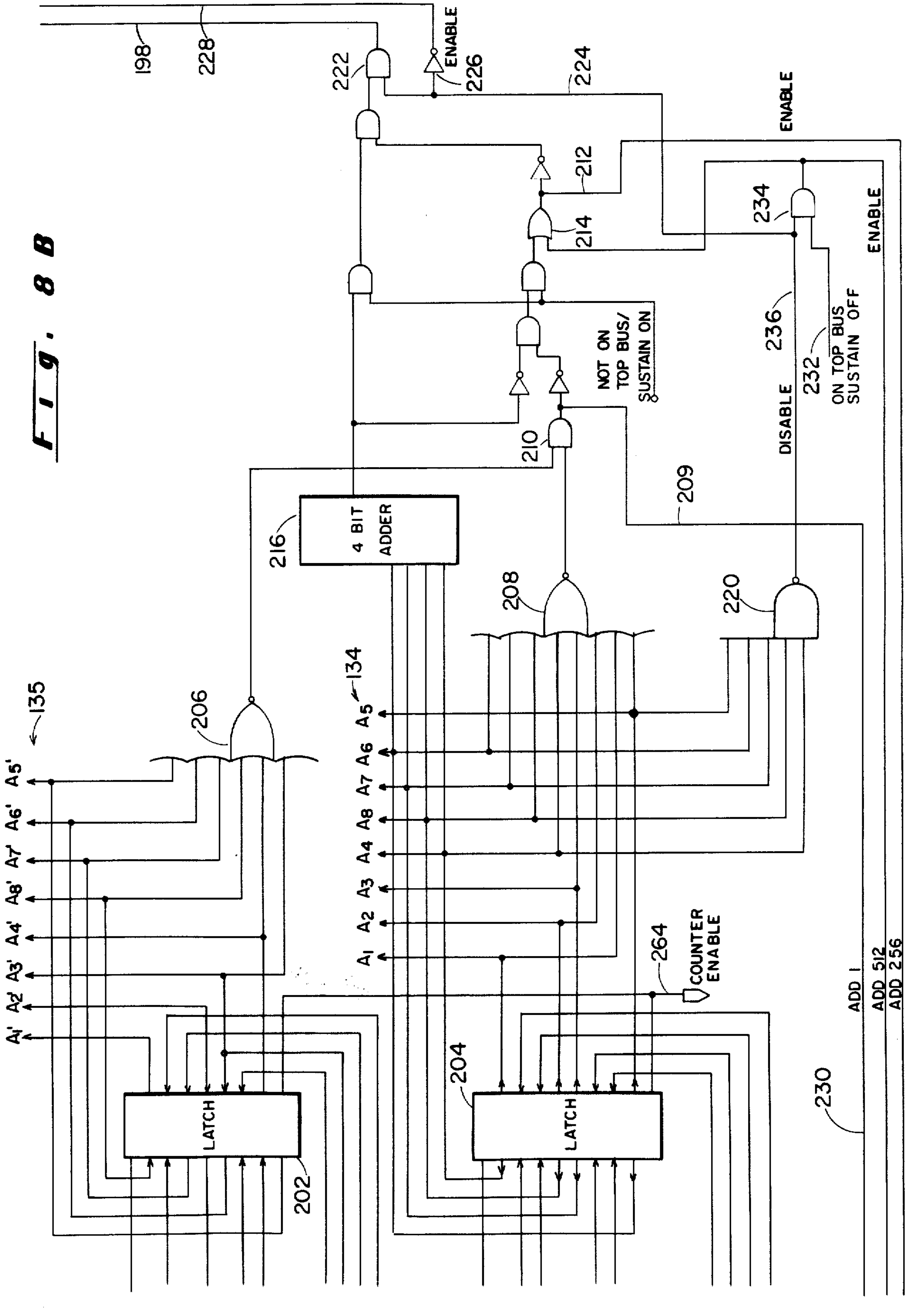
Figure 8C:
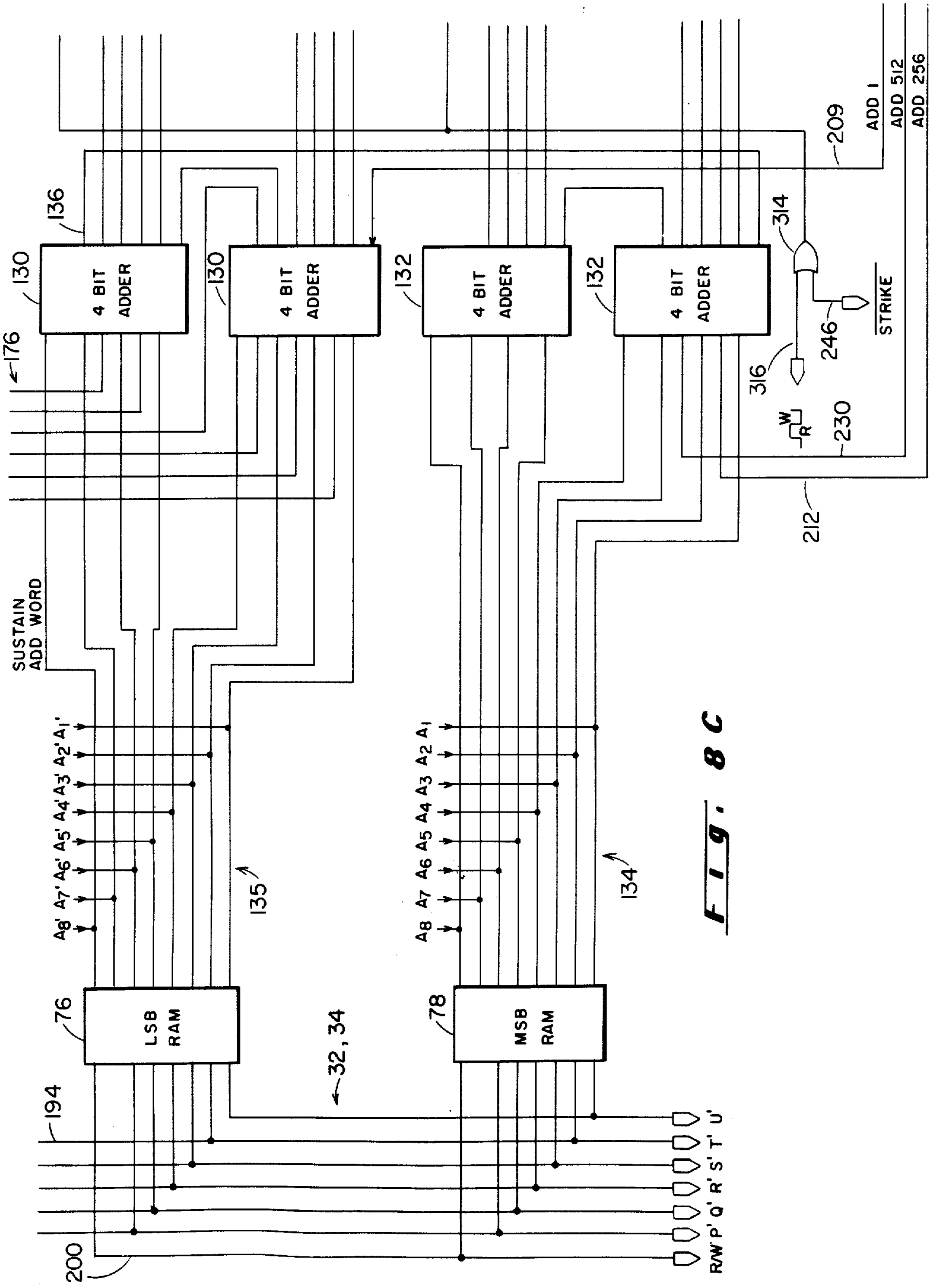

Turning now to FIGS. 8A, 8B and 8C, the block diagram of FIG. 3 will be described in greater detail. In FIG. 8A, lines 168 from analog to digital converter 172 are added to static voltage potentials on inputs 190 by four bit adder 166, and the five bit output 164 is connected to adders 160. The other inputs to adder 160 come from a series and AND gates 192 having as one set of inputs the P', Q', R', S' and T' most significant bits of the six bit address word for each of the keys 12 of keyboard 10. Thus, the five bit word on lines 194 will increment by one for each two keys of the keyboard, with the higher frequency keys having a larger address word and therefore causing a more rapid sustain. Inputs 194 are enabled by AND gates 192 except when the system is in the "combo piano" mode, and determined by a disabling signal on input 196. If the system is in the combo piano mode, then the sustains are not weighted according to key, but a constant sustain is selected.

Adders 160 have their outputs gated through by AND gates 148 when an enable signal is present on line 198 from the logic circuitry shown in FIG. 8B. The weighted sustain add word, which is six bits wide on lines 176 is connected to one set of inputs of adders 130 (FIG. 8C).

Figure 5:
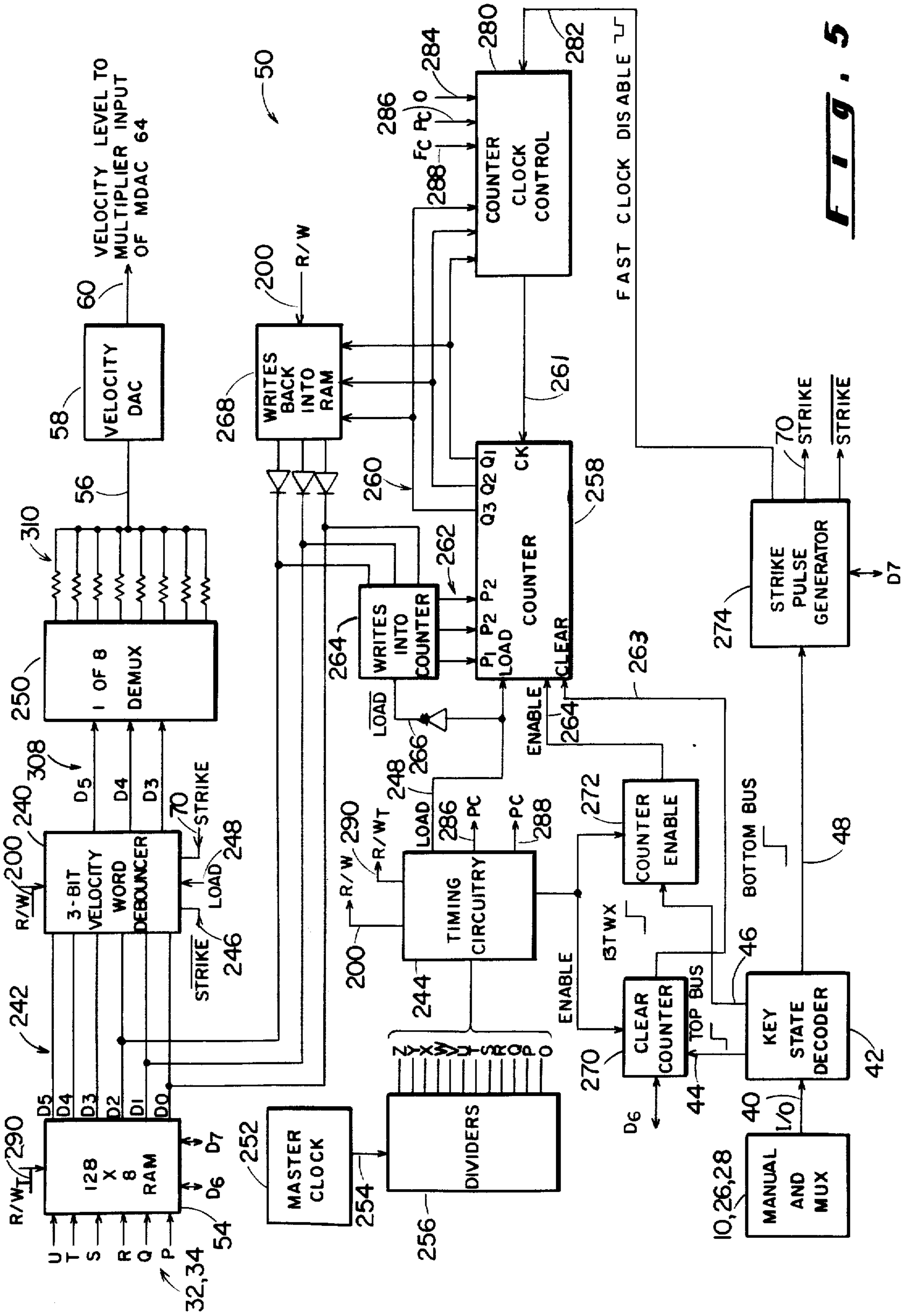
FIG. 5 is a block diagram of the velocity computing circuit.

The other inputs of adders 130 and 132 are connected to LSB ram 76 and MSB ram 78, respectively over data buses 135 and 134. Rams 76 and 78 are addressed by the six bit address lines 32, 34. The read/write line 200 from FIG. 5 is also connected to rams 76 and 78.

Prior to the sustain mode, when the pertaining key has just contacted the lower bus 18, an inverted strike pulse is present on line 246, which resets latches 202 and 204 (FIG. 8B) thereby writing all zeros into rams 76 and 78. On the next scan, NOR gates 206 and 208 will detect that a number lower than binary 5 is stored in the pertaining memory location of rams 76 and 78, and will cause the output 209 from AND gate 210 to produce an "add one" signal on line 209, which is connected to the LSB adder 130. The value "1" will again be added on the next three scans until NOR gates 206 and 208 detect that there is a binary number greater than 5 in RAMs 76 and 78, and at that point will disable 1 from being added in on line 209, and the logic circuitry 154 of FIG. 8B will cause a signal to a line 212 at the output of OR gate 214 to cause binary 256 to be added to the data word read out of memory 76 and 78 by the lower 4 bit adder 132 (FIG. 8C). This will continue until four bit adder 216 (FIG. 8B) detects a particular count on the four most significant bits of data bus 134, at which time a signal will appear on line 198 enabling AND gates 148 to cause the weighted sustain add word on lines 176 to be added to the accumulated data word in RAMs 76 and 78. At the same time, the sustain line 212 will be disabled.

The weighted sustain word will be added in until the number stored in RAMs 76 and 78 equals or exceeds 63488, and at this point, NAND gate 220 is triggered thereby disabling AND gate 222 so that adders 130 and 132 are no longer incremented by 56. At the same time, line 224 inverted by inverter 226 activates line 228 connected to NOR gates 138 so that the maximum input to multiplying digital to analog converter 64 is insured, thereby causing the lowest possible analog output on line 86. The reason for this is to prevent the adders from cycling back to their highest level when they become full so as to cause a rolling effect.

If a key 12 is released at any time during the attack, decay or sustain phases of the ADSR curve, an add word of 512 is added by the activation of line 230 connected to the lower four bit adder 132 (FIG. 8C). Line 230 will be activated if input 232 to AND gate 234 ind that the keyswitch 14 is on the top bus 16 and the sustain pedal is not on, and also that the output 236 of NAND gate 220 has not already disabled MDAC 64. The addition of the larger word 512 will cause the more rapid decaying out of the tones as indicated by the high slope portion 178 of ADSR curve 142 (FIG. 4).

Referring now to FIG. 5, the velocity control logic circuit 50 is shown in detail. Velocity RAM 54 is connected to a three bit velocity word debouncer 240 by D0, D1, D2, D3, D4, and D5 lines 242, and also includes D6 and D7 I/O lines and address lines 32, 34. Address lines 32, 34 are the same address lines that are used to synchronize the other portions of the system, so that all operations are accomplished in the appropriate time slots for the keys. Three bit velocity word debouncer has a read/write input 200 from timing circuitry 44, a strike input 70, a input 246, and a load input 248, also from timing circuitry 244. Debouncer 240 has its D3, D4 and D5 outputs connected to the inputs of a one of eight demultiplexer 250 having its output 56 connected to velocity digital to analog converter 58 as described previously.

Master clock 252 produces a high frequency output on line 254 which is divided by divider bank 256 into a plurality of address lines O–Z connected to timing circuitry 244. At the heart of velocity control logic 50 is a counter 258 clocked by clocking signals on line 261, cleared by signals on clear line 263, having a counter enable control input 264, a load input 248, outputs 260 and preset clock inputs 262. Block 264 writes three bit binary words from RAM 54 into counter under the control of a load signal on line 266, and block 268 writes the three bit output of counter 258 back into RAM 54 under the control of a read/write signal on line 200 from timing circuitry 244.

Key state decoder 42 decodes the tri-level input 40 to activate one of lines 44, 46 or 48 which are connected to clear counter 270, counter enable block 272 and strike pulse generator 274, respectively. As indicated earlier, depending on the state of input 40 for the particular time slot, key state decoder 42 will activate one of its output lines 44, 46 or 48.

Timing circuitry 244 is an array of gates that produces the timing signals shown in FIG. 7, as will be described at a later point.

Counter clock control 280 produces clock pulses on lines 260 at the input of counter on the data it receives from the counter outputs 261, the fast clock disable input 282, clock input 284, counter preset input 286 and fast clock input 288.

The operation of the circuit shown in FIG. 5 is as follows. The D6 line on RAM 54 keeps track of whether or not the keyswitch 14 has broken away from the bus for the first time since it previously made contact with the top bus 16. When key state decoder 42 activates line 44 to clear counter block 270, and the D6 input indicates that this is the first time keyswitch 14 has broken away from top bus 16, counter 258 is cleared by a clear signal on line 263. On the following write cycle, timing circuitry 244 will produce an output on line 290 connected to RAM 54 which will set the D6 bit low for that time slot and this will prevent the counter from being cleared again until the keyswitch 14 again contacts top bus 16. Write pulse 292 is shown in FIG. 7.

When the write cycle commences, the contents of counter 258, which are logic zeros for that time slot since keyswitch 14 has just broken away from the top bus, are written into ram 54 by block 268 under the control of the read/write signal on input 200. At this time, however, the output of DAC 58 does not change its level. On the next scan, keyswitch 14 is still between buses 16 and 18 and counter 258 is not cleared but counter enable input 264 goes positive thereby allowing 258 to increment if it should get a clock input on line 261 from counter clock control 280, and counter enable 264 also sets strike latches 202 and 204 (FIG. 8B). Within the time period of the counter enable pulse 296, a fast clock pulse 298 appears on input 288 to counter clock control 280, and this fast clock pulse will appear every other scan of manual 10 until counter 258 has incremented its Q3 output high for the first time, i.e., a binary count of five, at which time a fast clock pulse on line 288 can occur every manual scan. This causes counter 258 to increment more slowly during the early portion of a slow key depression and more rapidly during the latter portion thereof. Of course, if the key is depressed rapidly, then counter 258 will never increment to the point where the fast clock pulse 298 occurs on every scan of the manual. During the write cycle as determined by pulse 292, counter 258 cannot increment, but its contents on the Q1, Q2, and Q3 outputs are written into RAM 54 by write control block 268. This cycle continues until counter clock control 280 detects that a maximum binary 8 is present on line 260, and will not increment counter 258 any further so that binary 8 continues to be written into and read out of RAM 54 until keyswitch 14 wither contacts lower bus 18 or again contacts upper bus 16.

Figure 7:
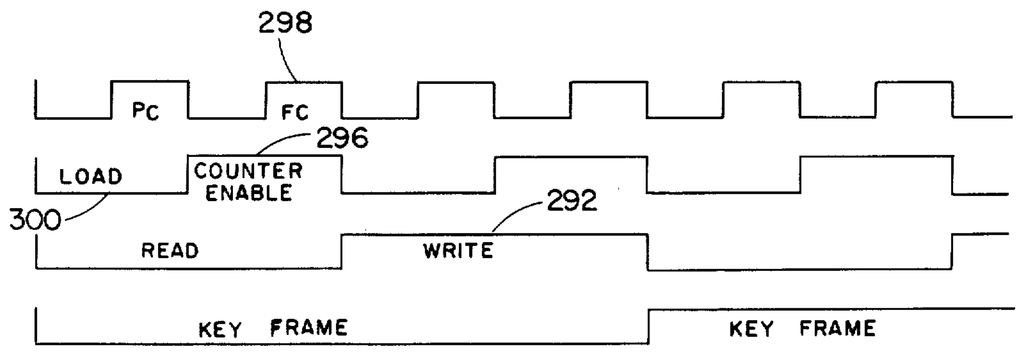
FIG. 7 is a timing diagram for the envelope generation circuit.

FIG. 7 illustrates the timing arrangement wherein for a key frame, counter 258 first reads the data stored in RAM 54 on the receipt of a load pulse 300, is then caused to increment by counter enable pulse 296, and subsequently writes the new count back in RAM 54 under the control of Write pulse 292.

When keyswitch 14 contacts lower bus 18, line 48 from key state decoder 42 goes high and strike pulse generator 274 will produce a fast clock disable pulse on line 282 so that counter 258 will no longer be incremented. Strike pulse 70 updates one of eight demultiplexer chip 250 through three bit velocity word debouncer 240 thereby setting a new input 56 to velocity DAC 58 for that time frame.

Figure 6:
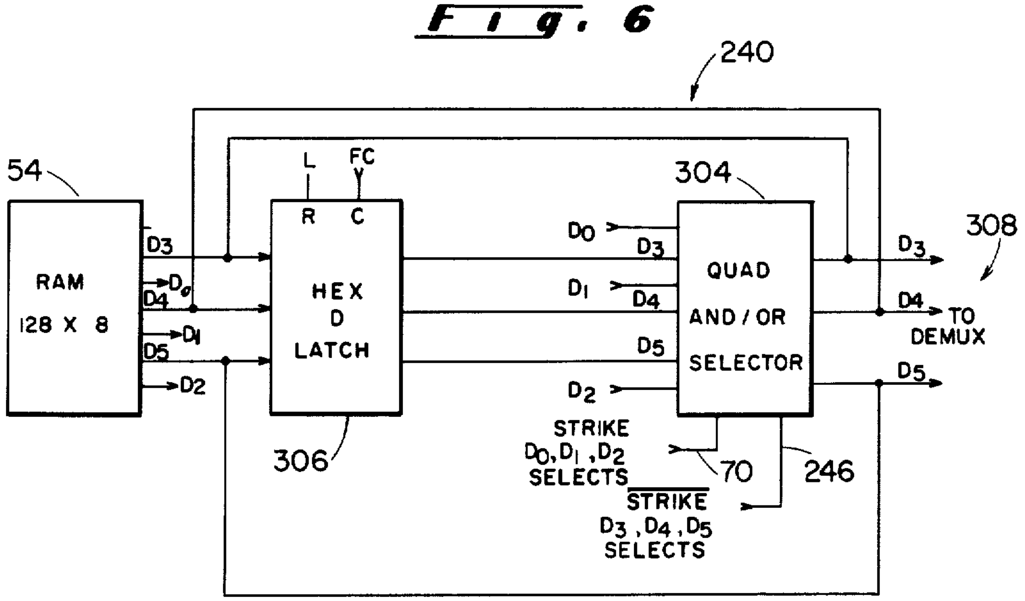
FIG. 6 ls a block diagram of a portion of FIG. 5.

With reference to FIG. 6, three bit velocity word debouncer 240 comprises a quad and/or selector 304 having D0, D1, and D2 inputs connected directly to RAM 54, write block 268, and read block 264, and the D3, D4, and D5 inputs from the hex D latch 306 connected to the D3, D4, and D5 inputs of RAM 54. During the time that keyswitch 14 is between buses 16 and 18, quad and/or selector 304 is controlled by the strike bar input 246 to write the D0, D1 and D2 lines back into RAM 54, so that they do not appear on the D3, D4 and D5 outputs 308 to demultiplexer 250, thereby causing velocity DAC 58 to remain shut off during the computation of the velocity data. When the strike pulse is generated on line 70 and the strike bar signal appears on line 246, quad and/or selector writes the D0, D1 and D2 lines of data into the D3, D4 and D5 locations of RAM 54, and continues to select the D3, D4 and D5 lines of RAM 254 for outputting to DAC 58 until keyswitch 14 again contacts upper bus 16. Thus, the circuitry of FIG. 6 utilizes two locations in RAM 54 with three bits in the temporary storage location D0, D1, D2, and then transfers the three bit data into the permanent storage location D3, D4, D5 until keyswitch 14 again contacts the upper bus. While the key is being held, the D3, D4, and D5 lines are outputted to velocity DAC 58.

The positive going strike pulse causes the D7 bit of RAM 54 to be set high during the write cycle and this bit will not be set low until the key hits the top bus again. This, in effect, is the mechanism which limits the system to one strike pulse per complete key depression. Keyboard sensitivity is achieved by placing the lowest value resistor or resistors 310 at the output of one of a demultiplexor 250 under the control of an external slide potentiometer.

After keyswitch 14 has contacted lower bus 18 and the strike pulse has been generated, the strike bar pulse on input 246 (FIG. 8C) will clear latches 202 and 204 so that the envelope generation cycle described earlier can be initiated. Latches 202 and 204 will be latched during each write cycle because of the input 316 to OR gate 314.

The aforedescribed cycle of envelope generation and velocity data calculation occurs during each time slot of the keys and on each scan of the keyboard. Such updating and calculation need not occur on every scan of the keyboard, but could be less often, such as on every other scan depending on the multiplex rate, degree of fineness of control desired, and the like. Furthermore, multiplexing system whereby time slots of keys which have had no change in data, such as keys which are not actuated, could be ignored and the calculations carried out only for those keys for which a key state change has occurred. Furthermore, microprocessor control could be utilized for reading the keyswitch data and for processing the data on the inputs of velocity DAC and multiplying DAC 64.

This system can also be used for producing non-percussion tones that have amplitudes selected by velocity sensitive key actuations.

While this invention has been described as having a preferred design, it will be understood that it is capable of further modification. This application is, therefore, intended to cover any variations, uses or adaptations of the invention following the general principles thereof and including such departures from the present disclosure as come within known or customary practice in the art to which this invention pertains and fall within the limits of the appended claims.

What is claimed is:

1. An electronic keyboard musical instrument comprising:

a keyboard having a plurality of playing keys adapted to be depressed, each of said keys having the capability of being selectively in a nominal undepressed state, a nominal partially depressed state, and a nominal fully depressed state, multiplex means for multiplexing said keyboard and developing a plurality of time slots corresponding on a one-to-one basis to said keys and generating key state signals in said time slots each indicating whether the pertaining key is in its undepressed, partially depressed or fully depressed state, velocity computing means time shared among the keys of the keyboard and responsive to the key state signals for computing, each time slot of a scan of the keyboard, velocity data correlated to the amount of time that the pertaining key, if partially depressed, has been in its partially depressed state, and storing said data in corresponding locations of a velocity memory assigned to the pertaining keys, said computing means accessing data in said velocity memory, updating said data on subsequent scans as long as the pertaining keys are still in their partially depressed states, and storing final values of said velocity data in the memory locations assigned to the keys as the pertaining keys reach their fully depressed states, envelope generator means time shared among the keys of the keyboard responsive to the key state signals for computing and outputting envelopes for the fully depressed keys, each envelope comprising a plurality of discrete amplitude levels computed in the time slots of the pertaining keys during a respective plurality of scans of the manual, said envelope generator means storing data correlated to the amplitude level calculated during each time slot of the scan in locations of an envelope memory assigned to the pertaining keys to provide a reference for the amplitude level calculated on a subsequent scan, said velocity computing means reading said final value velocity data out of said velocity memory onto an output in synchronism with the outputting of the envelope amplitude levels, means for combining the read out velocity data and the output amplitude levels to produce on a time shared basis among the fully depressed keys envelopes scaled by the velocity data for the respective keys, and tone means responsive to the key state data and to the scaled envelopes for generating tones of frequencies corresponding to the fully depressed keys and having respective said envelopes.

2. The instrument of claim 1 wherein said multiplex means includes tri-level encoder means connected to said keyboard for producing said key state signals and a multiplexer connected to said encoder means for multiplexing said key state signals.

3. The instrument of claim 1 including master timing means for driving said multiplex means, said velocity computing means and said envelope generator means in synchronism with each other and addressing said memories.

4. The instrument of claim 1 wherein said velocity computing means comprises: a velocity counter, means during each time slot of a scan for the respective partially depressed keys for reading out of said velocity memory the updated velocity data, loading said read out velocity data into said counter, incrementing said counter to a new count, and writing the new count into said velocity memory as newly updated velocity data.

5. The instrument of claim 4 including means for incrementing said velocity counter by different amounts depending on the velocity data loaded into said counter.

6. The instrument of claim 4 including means for during said velocity counter during the respective time slots of the keys when the pertaining key is in its undepressed state and for preventing said counter from incrementing during the time slot of any key which is fully depressed.

7. The instrument of claim 4 wherein said envelope generator means comprises: an envelope adder means operative during each time slot of a respective fully depressed key for reading out of said envelope memory the stored data, loading the data read out of said envelope memory into said envelope adder, said adder adding to the data loaded therein an add word of a selected value to form a sum, Writing the sum back into said envelope memory, and outputting said sum to said means for combining.

8. The instrument of claim 7 wherein said envelope generator means produces an A.D.S.R. envelope having an attack portion, a decay portion, a sustain portion and a release portion, and said envelope generator means includes means for selecting diverse add words for the amplitude levels in the decay, sustain and release portions of the envelope so that the diverse envelope portions have diverse slopes.

9. The instrument of claim 8 wherein said envelope generator means comprises means responsive to the positions of the keys on the keyboard for selecting add words for said adder of different amounts during the sustain portions depending on the positions on the keyboard of the fully depressed keys.

10. The instrument of claim 1 wherein said envelope generator means comprises: an envelope adder means operative during each time slot of a respective fully depressed key for reading out of said envelope memory the stored data, loading the data read out of said envelope memory into said envelope adder, said adder adding to the data loaded therein an add word of a selected value to form a sum, Writing the sum back into said envelope memory, and outputing said sum to said means for combining.

11. The instrument of claim 10 wherein said envelope generator means produces an A.D.S.R. envelope having an attack portion, a decay portion, a sustain portion and a release portion, and said envelope generator means includes means for selecting diverse add words for the amplitude levels in the decay, sustain and release portions of the envelope so that the diverse envelope portions have diverse slopes.

12. The instrument of claim 11 wherein said envelope generator means comprises means responsive to the positions of the keys on the keyboard for selecting add words for said adder of different amounts during the sustain portions depending on the positions on the keyboard of the fully depressed keys.

13. An electronic keyboard musical instrument comprising:

a keyboard having a plurality of playing keys adapted to be depressed, each of said keys having the capability of being selectively in a nominal undepressed state, a nominal partially depressed state and a nominal fully depressed state, key information multiplex means for scanning said keys and encoding the states of said keys to produce a time division multiplexed series of key state signals occupying respective time slots corresponding to said keys, wherein each signal is indicative of the state of the pertaining key, a velocity memory, velocity computing means synchronized with said multiplex means and time shared among all the keys for computing and storing in said memory on a time shared basis among said keys a velocity value representing the amount of time that each fully depressed key was in its partially depressed state before reaching its fully depressed state, said velocity computing means computing the velocity values by periodically accessing the stored velocity values and updating said values as long as the Pertaining keys are in their partially depressed states, said velocity computing means addressing said memory on a time shared basis among the fully depressed keys to store said velocity values in memory locations for the respective fully depressed keys and to read out said stored values for each fully depressed key onto a velocity output, envelope generator means for generating on an envelope output a percussion envelope for each fully depressed key in a piecewise fashion time shared among the fully depressed keys, and tone means having inputs connected to said envelope and velocity outputs and responsive to the depression of fully depressed keys of the keyboard for producing tones having frequencies corresponding to the fully depressed keys and having envelopes corresponding to the pertaining percussion envelopes scaled in amplitude in accordance with the pertaining velocity values.

14. The instrument of claim 13 wherein said velocity computing means comprises means for reading out of said velocity memory a velocity value for the pertaining key and adding to the read out velocity value an increment value to form a new value and then writing the new value back into said memory.

15. The instrument of claim 14 wherein said means for reading out and adding comprises: a velocity counter, means for presetting said counter by the read out value, and means for incrementing said counter during the time slot of the pertaining key.

16. The instrument of claim 15 wherein said means for incrementing said velocity counter increments said counter by different amounts in response to the value read out of said velocity memory.

17. The instrument of claim 13 wherein said envelope generator means is operable during each time slot of a fully depressed key and includes means for calculating data representing a discrete amplitude level for the key pertaining to that time slot and loading that data into an envelope memory.

18. The instrument of claim 17 wherein said envelope generator means during each time slot of a depressed key reads out of said envelope memory the data loaded therein on the previous scan, loads the data read out of the envelope memory into an adder, loads increment data into said adder to form sum data, writes the sum data back into said envelope memory, and places the sum data on the envelope output.

19. An electronic keyboard musical instrument comprising:

a keyboard having a plurality of playing keys adapted to be depressed, each of said keys having the capability of being selectively in a nominal undepressed state, a nominal partially depressed state and a nominal fully depressed state, key information multiplex means for scanning said keys and encoding the states of said keys to produce a time division multiplexed series of key state signals occupying respective time slots corresponding to said keys, wherein each signal is indicative of the state of the pertaining key, a velocity memory having locations assigned to said respective keys, velocity computing means synchronized with said multiplex means and responsive thereto for timing the movement of each depressed key from its undepressed state to its fully depressed state on a time shared basis among said keys, said computing means addressing said memory and storing in locations of said memory assigned to the respective keys digital values correlated to the amount of time that pertaining keys have been in their partially depressed states and storing final values correlated to the total times of the respective keys in their partially depressed states when the respective keys reach their fully depressed states, said velocity computing means computing the digital values by accessing, on respective scans of the keyboard, data in said memory relating to the amount of time that the pertaining keys have been partially depressed, updating the data, and storing the updated data in said memory, said velocity computing means reading out of said memory onto a velocity output said final values during the time slots of the pertaining keys, said velocity computing means updating said memory means as the keys move from their undepressed states to their fully depressed states on a regular basis each scan or a multiple of scans of the keyboard, envelope generator means responsive to said key information multiplex meand for generating on an envelope output a percussion envelope for each fully depressed key in a time shared manner among said keys of the keyboard, said envelope generator means computing and placing on said envelope output a percussion envelope for each fully depressed key in a time shared manner among said keys of the keyboard, said envelope generator means computing and placing on said envelope output a digital value representing a discrete amplitude level for a point on the envelope during the time slot of the pertaining key, and tone means having inputs connected to said envelope and said velocity outputs for combining the velocity values and envelope values for each fully depressed key and generating tones fo frequencies corresponding to the fully depressed keys having respective envelopes corresponding to the pertaining envelopes on the envelope output amplitude scaled by the pertaining velocity values.

20. An electronic keyboard musical instrument comprising:

a keyboard having a plurality of playing keys adapted to be depressed, each of said keys having the capability of being selectively in a nominal undepressed state, a nominal partially depressed state and a nominal fully depressed state, key information multiplex means for scanning said keys and encoding the states of said keys to produce a time division multiplexed series of key state signals occupying respective time slots corresponding to said keys, wherein each signal is indicative of the state of the pertaining key, a velocity memory having locations assigned to said respective keys a velocity computing means synchronized with said multiplex means and responsive thereto for timing the movement of each depressed key from its undepressed state to its fully depressed state on a time shared basis among said keys, said computing means addressing said memory and storing in locations of said memory assigned to the respective keys digital values correlated to the amount of time that the pertaining keys have been in their partially depressed states and storing final values correlated to the total times of the respective keys in their partially depressed states when the respective keys reach their fully depressed states, said velocity computing means reading out of said memory onto a velocity output said final values during the time slots of the pertaining keys, said velocity computing means updating the values in the memory locations of the pertaining keys as the keys move from their undepressed states to their fully depressed states on a regular basis each scan or a multiple of scans of the keyboard, envelope generator means responsive to said key information multiplex means for generating on an envelope output a percussion envelope for each fully depressed key in a time shared manner among said keys of the keyboard, said envelope generator means computing and placing on said envelope output a percussion envelope for each fully depressed key in a time shared manner among said keys of the keyboard, said envelope generator means computing and placing on said envelope output a digital value representing a discrete amplitude level for a point on the envelope during the time slot of the pertaining key, digital to analog converter means having a first input connected to said envelope output and a second input connected to said velocity output for producing on an output a time division multiplexed series of velocity scaled analog amplitude signal levels for the keys of the keyboard, demultiplex means connected to said converter means for demultiplexing said analog envelope amplitude levels onto a plurality of parallel envelope outputs for the respective keys of the keyboard, tone generator means for producing tones, and keyer means having inputs connected to said tone generator means and inputs connected to said demultiplex means for keying selected said tones to an output circuit and acoustical transducer with amplitude envelopes corresponding to the envelopes on the envelope outputs of said demultiplex means.

21. The instrument of claim 20 wherein said digital to analog converter means comprises a digital to analog converter connected to the output of said velocity computing means and having an analog output connected to the multiplying input of a multiplying digital to analog converter.

* * * * *

UNITED STATES PATENT AND TRADEMARK OFFICE

CERTIFICATE OF CORRECTION

PATENT NO. : 4,493,237

DATED : January 15, 1985

INVENTOR(S) : Charles E. Delong et al

It is certified that error appears in the above—identified patent and that said Letters Patent is hereby corrected as shown below:

Col. 4, line 8, change "1s" to --is--.
Col. 8, line 43, change "ind" to --indicates--.
Col. 9, line 23, insert --258 depending-- after "counter",
line 50, insert --counter-- before "258".

IN THE CLAIMS

Claim 13, col. 13, line 38, change "Pertaining" to --pertaining--.
Claim 19, col. 14, line 61, change "meand" to --means--;
col. 15, line 8, change "fo" to --of--.

Signed and Sealed this

*Twenty-eighth* Day of *May 1985*

[SEAL]

*Attest:*

DONALD J. QUIGG

*Attesting Officer* *Acting Commissioner of Patents and Trademarks*